Patented June 20, 1939

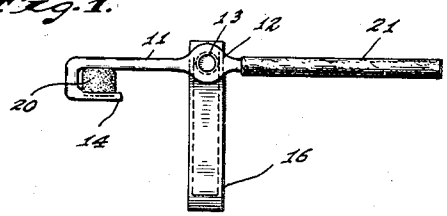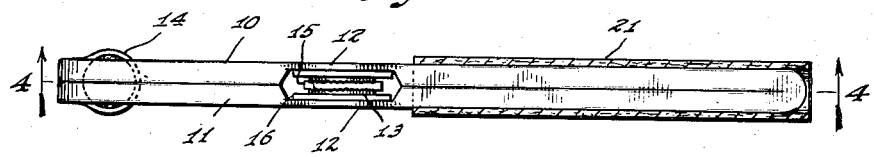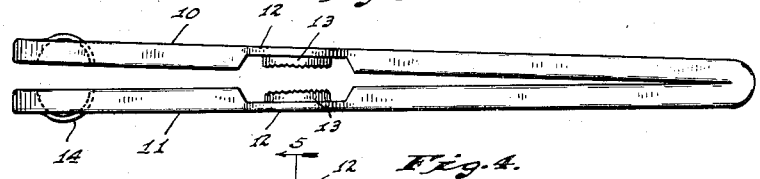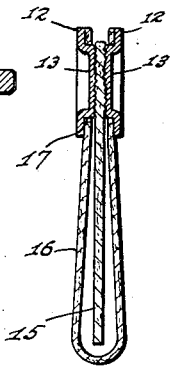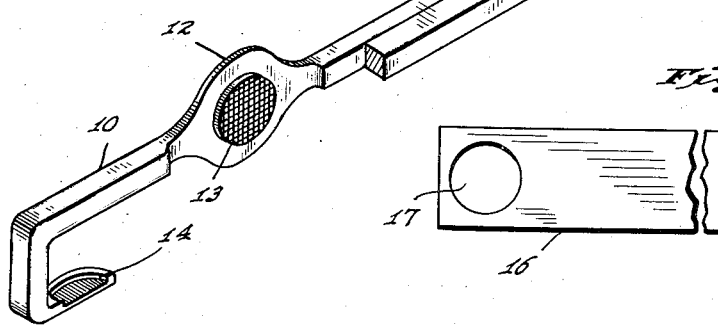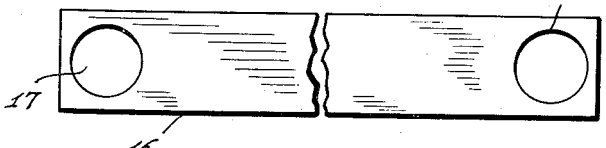

2,162,978

UNITED STATES PATENT OFFICE 2,162,978

DEVICE AND PROCESS FOR PERFORMING CHEMICAL ANALYSES

Albert C. Seaton, Indianapolis, Ind.

Application October 9, 1937, Serial No. 168,252

4 Claims. (Cl. 23—230)

My invention relates to chemical analyses of the type in which the presence of a suspected ingredient in a liquid is indicated by a color change when the liquid is heated, usually after the addition of one or more reagents. The well known procedure of testing urine for the presence of sugar by the use of Fehling's solution is an example of such analyses.

The making of analyses of this type has heretofore been restricted to situations in which there is available a certain amount of equipment in the way of reaction vessels such as test tubes, reagent bottles, and a Bunsen burner or other heating means, and the field of use of such procedure is therefore limited. Moreover, such tests require that the person conducting them be capable of interpreting the results obtained. This method of testing is open to the further objection that certain conditions, such for example as cloudiness of the liquid being tested, prevent or delay the obtaining of satisfactory results.

It is the object of my invention to improve the test procedure described above to eliminate the necessity for extensive equipment or any substantial degree or skill on the part of the operator. More specifically, it is my object to provide a device and a procedure which will enable accurate results, both quantitative and qualitative, to be obtained and automatically recorded in permanent form. Another object of my invention is to provide a small and light-weight test device which can easily be carried on the person or transported through the mails. Still another object of my invention is to eliminate the effect of some factors which, in the conventional procedure, make difficult or delay the obtaining of accurate test results.

In carrying out my invention, the procedure I employ is to impregnate paper or other suitable material with the reagent or reagents to be used in the test. This paper or other material, after being dried, is dipped into the liquid to be tested and, after waiting for a short interval to insure solution of the solid reagent or reagents with which the absorbent material has been impregnated, a controlled quantity of heat is applied to a localized area of the paper to cause the test reaction. The presence of the suspected ingredient will then be indicated by the formation of a spot of color within the heated area of the paper, and the size of this spot and its depth of color will constitute a reasonably accurate quantitative indication of the amount of suspected material present in the liquid tested.

In its preferred form, the test device is made of two strips of metal of relatively high heat conductivity, and the absorbent paper or other material, impregnated with such reagents as the test requires, is clamped in a definite location between them and arranged to extend laterally therefrom. At a point remote from the location of the paper, the metal strips are formed to provide a support for a quantity of combustible material. When the end of the laterally projecting paper is dipped into the liquid to be tested such liquid will permeate all parts of the paper thoroughly as the result of capillary attraction and will dissolve any reagents with which the paper was impregnated. Thereafter, if the combustible material is ignited, heat resulting from its burning will be conducted through the metal strips to that portion of the paper which is clamped between the strips and will raise the liquid therein to the reaction temperature. Upon completion of the test, the strips of metal are separated and the paper removed to make visible that portion to which heat has been applied.

The accompanying drawing illustrates my invention: Fig. 1 is a side elevation of a preferred form of the test device; Fig. 2 is a plan view of the finished device; Fig. 3 is also a plan view, but illustrates the two metal strips separated for the insertion of the paper and the combustible material; Fig. 4 is a section on the line 4—4 of Fig. 2; Fig. 5 is a transverse section on the line 5—5 of Fig. 4; Fig. 6 is an isometric view of the device with a portion thereof broken away; and Fig. 7 is a plan view of one of the paper strips.

In the particular form illustrated in the drawing, the device embodies a single piece of square wire bent upon itself to form two co-extensive legs 10 and 11. The wire employed should be of copper or of some other material having high heat conductivity. At an intermediate point, each of the legs 10 and 11 is flattened to produce an enlargement 12, and the center portion of each enlargement is displaced inwardly in the form of a circular boss 13. The extreme ends of the legs 10 and 11 are bent downwardly and then rearwardly beneath the bodies of the legs, and such rearwardly extending portions are shaped to provide conjointly an upwardly opening cup 14.

If two or more reagents are used in the test, and especially if they are of such nature that it is necessary to prevent any possibility of a reaction between them before making the test, I may embody in the test device a plurality of strips of paper or other suitable material separately impregnated with the several reagents. Thus, in a device intended for use in testing urine for sugar content, I may employ two strips of paper, one impregnated with copper sulphate and the other with sodium carbonate, the sodium carbonate being carried by a strip of absorbent paper or other suitable material 15 having a width slightly greater than the diameter of the boss 13 and of a length to project downwardly for a considerable distance below the cup 14, and the copper sulphate being carried by a second strip 16 which has approximately twice the length of the strip 15 and the same or slightly greater width, and which is provided at its ends with openings 17 of a diameter to receive the bosses 13. If a single reagent or none at all is required for the test, the strip 16 may be eliminated.

In assembling the device, the two legs 10 and 11 are separated as indicated in Fig. 3, the strip 16 is doubled over the strip 15 and inserted between the flattened portions 12 on the two legs 10 and 11, with the holes 17 placed over the respective bosses 13, and the upper end of the strip 15 disposed between the bosses the surfaces of which may be roughened to obtain a more intimate contact with and a firmer clamping of the paper between them. While the legs 10 and 11 are still separated, a pellet 20 of combustible material is inserted into the two halves of the cup 14.

When the two legs 10 and 11 are returned to the normal position illustrated in Fig. 2, the upper end of the strip 15 will be clamped between the two bosses 13, the ends of the strip 16 will be held in place by engagement of the holes 17 with the bosses 13, and the pellet 20 of combustible material will be retained in position in the cup 14. Desirably the pellet 20 is so formed as to engage the lower surface of the legs 10 and 11 to prevent its displacement from the cup 14. After assembly, a sleeve 21 of some suitable heat-insulating material may be slipped over the ends of the legs 10 and 11 to hold them together and to provide a handle by which the device may be held while the test is being conducted.

In making the test, the device held with the strips 15 and 16 extending downwardly from it as indicated in Fig. 1 is dipped into the liquid to be tested and then removed. The looped strip 16 will retain sufficient liquid to dissolve any reagent or reagents in the strips 15 and 16. After waiting a suitable interval to insure the saturation of that portion of the strip 16 clamped between the bosses 13 with liquid bearing the dissolved reagents, the pellet 20 is ignited. As it burns, heat is transferred to the outer ends of the legs 10 and 11 and is conducted rearwardly to the bosses 13 where it is transmitted to the upper end of the strip 16 between the bosses and raises the liquid therein to its boiling point. When the pellet 20 has been entirely consumed, the handle 21 may be removed, the legs 10 and 11 separated, and the absorbent strips 15 and 16 withdrawn.

In a device adapted for testing urine for sugar and embodying strips 15—16 carrying the reagents above noted, the presence of sugar will be indicated by a reddish or reddish brown spot of copper oxide on that portion of the strip 16 which was clamped between the bosses 13, and the size of this spot will be indicative of the proportionate amount of sugar present. To facilitate reading the size of the copper oxide spot, the upper end of the strip 15 may have printed upon it a grid or system of co-ordinates, as indicated in Fig. 4.

To control the quantity of reagents present in the strips 15 and 16, those strips may be respectively immersed in solutions of the reagents of a strength sufficient to leave the proper quantity of reagents in the strips after they are dried. The strips 15 and 16 are made of material through which liquids can readily pass by capillary attraction; so that complete immersion of the strips in liquid will not be necessary to secure uniform saturation. I have found paper of the grade customarily used for filter paper to serve the purpose excellently.

The material employed for the pellet 20 may vary widely. For best results, the material should be one which does not melt or disintegrate as it burns; as otherwise some of it might be lost and an inadequate quantity of heat obtained. I have found hexamethylene-tetramine, finely powdered and compressed into a tablet of desired dimensions, to be very suitable.

A device which I have employed with satisfactory results in testing urine for its sugar content has embodied strips 15 and 16 of filter paper, the strip 15 being approximately $\tfrac{7}{16}$ of an inch in width and other dimensions of the device being in about the proportions indicated in the drawing. The strips 15 and 16 were impregnated with the reagents in the manner indicated above, the strip 15 containing approximately 7 mg. of sodium carbonate and the strip 16 containing approximately 20 mg. of cupric sulphate. The pellet 20 was a compressed tablet of hexamethylene-tetramine and weighed about 125 mg.

By testing solutions of known sugar content with my device, I have found that a rather definite relation exists between the size of the spot of copper oxide produced on the strip 15 and the proportionate quantity of sugar present in the solution. Quantitative results obtained in this way are considerably more accurate than estimates based on the results of visual observation of test-tube reactions.

My test device, being small and compact, is readily transportable and therefore may be made more easily available than the equipment necessary in other test procedures. No skill is necessary in conducting the test, as no measurements are required. The results of the test are permanently and automatically recorded by the production of the copper oxide spot on the strip 15; thus making it unnecessary for the one reading the results of the test to conduct it. All factors which might affect the results of the test are readily controllable, the amount of each reagent present being regulated by the strength of the solution with which each strip of absorbent material is saturated, and the quantity of heat or the reaction temperature being controlled by the size and nature of the pellet 20, by its distance from the bosses 13, and by the cross-sectional area of the wires through which the heat is conducted to the absorbent material.

I claim as my invention:

1. A method of testing urine for the presence of sugar, which comprises partially immersing in the liquid juxtaposed strips of absorbent material respectively impregnated with cupric sulphate and an alkaline material, permitting the liquid to spread therethrough by capillary attraction, and applying heat to a portion of one of said strips which was not immersed.

2. A method of testing urine for the presence of sugar, which comprises partially immersing in the liquid juxtaposed strips of absorbent material respectively impregnated with cupric sulphate and an alkaline material, permitting the liquid to spread therethrough by capillary attraction, and conducting heat through a member of heat-conducting material to a point on such member in contact with a portion of one of said strips which was not immersed.

3. A device for use in performing chemical analyses of liquids, comprising two parallel metallic wires having at an intermediate point opposed flattened portions adapted to grip between them a strip of absorbent material projecting laterally from the wires, a handle of heat-insulating material embracing said wires at one end, and means at the opposite ends of said wires for supporting a pellet of combustible material in heat-exchanging relation with the wires.

4. A device for use in performing chemical analyses of liquids comprising an elongated metallic body, means intermediate the length of said body for holding in contact therewith a strip of absorbent material projecting laterally from the body, a handle of heat-insulating material at one end of the body, and means at the other end of the body for holding a pellet of combustible material in heat-exchanging relation therewith.

ALBERT C. SEATON.